United States Patent [19]  
Kratel et al.

[11] 4,191,587  
[45] Mar. 4, 1980

[54] PREPARATION OF HYDROPHOBIC SILICON DIOXIDE

[75] Inventors: Günter Kratel; Günter Stohr, both of Durach; Hans Katzer, Munich, all of Fed. Rep. of Germany

[73] Assignee: Wacker-Chemie GmbH, Munich, Fed. Rep. of Germany

[21] Appl. No.: 965,537

[22] Filed: Nov. 30, 1978

[30] Foreign Application Priority Data

Dec. 7, 1977 [DE] Fed. Rep. of Germany ....... 2754484

[51] Int. Cl.$^2$ .......................... C09C 3/12; C04B 31/44
[52] U.S. Cl. ................................. 106/308 Q; 427/220; 428/405; 260/42.15; 423/275
[58] Field of Search ............ 106/288 B, 308 Q, 308 B, 106/309; 423/267, 275, 335; 427/220, 219; 428/405; 260/42.15

[56] References Cited

U.S. PATENT DOCUMENTS

| | | | |
|---|---|---|---|
| 3,132,961 | 5/1964 | Pierpoint et al. | 106/308 Q |
| 3,677,784 | 7/1972 | Nitzsche et al. | 106/288 B |
| 3,931,262 | 1/1976 | Wirth et al. | 106/308 Q |
| 3,948,676 | 4/1976 | Laufer | 106/308 Q |
| 4,005,254 | 1/1977 | Mackenzie, Jr. | 428/405 |
| 4,007,050 | 2/1977 | Laufer et al. | 106/308 Q |
| 4,068,024 | 1/1978 | Laufer | 106/288 B |

*Primary Examiner*—O. R. Vertiz  
*Assistant Examiner*—Thomas W. Roy

[57] ABSTRACT

This invention relates to a process for preparing hydrophobic silicon dioxide which comprises treating silicon dioxide having a surface area of at least 50 m$^2$/g with an organosilicon compound containing from 2 to 4 silicon atoms per molecule, in which at least 2 hydrocarbon radicals are bonded to each silicon atom, and any silicon valences which are not satisfied by hydrocarbon radicals are satisfied by siloxane oxygen atoms and at least one tin compound containing Sn-bonded halogen and/or organic radicals.

2 Claims, No Drawings

PREPARATION OF HYDROPHOBIC SILICON DIOXIDE

The present invention relates to hydrophobic silicon dioxide and more particularly to a process for treating silicon dioxide to impart hydrophobic properties thereto.

BACKGROUND OF INVENTION

Silicon dioxide has been used in various applications in which it is preferred that the surface have hydrophobic properties. One method which has been used to impart hydrophobic properties to silicon dioxide is described in U.S. Pat. No. 3,132,961 to Pierpoint et al., in which silicon dioxide having a surface area of more than 50 m$^2$/g is treated with for example octamethylcyclotetrasiloxane and an acid. Compared to the process described in this patent, the process of this invention has the advantage that the inherent dangers of corrosion caused by the use of an acid is avoided. Moreover, the silicon dioxide obtained from the process of this invention exhibits a higher degree of hydrophobicity.

Therefore, it is an object of this invention to provide a process for preparing silicon dioxide having hydrophobic properties. Another object of this invention is to provide a process for preparing hydrophobic silicon dioxide in the absence of a corrosive acid. A further object of this invention is to provide a process for preparing silicon dioxide having a higher degree of hydrophobicity.

SUMMARY OF INVENTION

The foregoing objects and others which will become apparent from the following description are accomplished in accordance with this invention, generally speaking, by providing a process for preparing hydrophobic silicon dioxide which comprises treating silicon dioxide having a surface area of at least 50 m$^2$/g with at least one organosilicon compound having from 2 to 4 silicon atoms per molecule in which at least two hydrocarbon radicals are bonded to each silicon atom, and the silicon valences which are not satisfied with hydrocarbon radicals are satisfied by siloxane oxygen atoms and at least one tin compound containing Sn-bonded halogen and/or organic radicals.

DETAILED DESCRIPTION OF INVENTION

The silicon dioxide is preferably pyrogenically produced silicon dioxide having a surface area of at least 50 m$^2$/g. If desired, it is however possible to use silicic acid hydrogel which has been dehydrated while preventing its structure, as well as other precipitated silicon dioxide having a surface area of at least 50 m$^2$/g (measured by nitrogen absorption in accordance with the method described in ASTM Special Technical Bulletin No. 51, 1941, page 95, also known as the "BET Method").

It is preferred that the hydrocarbon radicals bonded to the organosilicon compounds employed in this invention have from 1 to 12 carbon atoms. Examples of suitable hydrocarbon radicals are alkyl radicals such as methyl, ethyl, n-propyl, isopropyl and n-butyl radical, as well as the dodecyl radicals; cycloalkyl radicals such as the cyclohexyl radical; alkenyl radicals such as the vinyl radical; aryl radicals such as the phenyl radical; alkaryl radicals such as tolyl radicals; and aralkyl radicals such as the benzyl radical. Preferably the hydrocarbon radical is the methyl radical.

Suitable examples of organosilicon compounds which may be employed in this invention are hexamethyldisiloxane, hexamethylcyclotrisiloxane, octamethylcyclotetrasiloxane and 1,3,5,7-tetramethyl-1,3,5,7-tetravinylcyclotetrasiloxane.

It is preferred that the organosilicon compounds be used in an amount of from 4 to 40 percent by weight, based on the weight of the silicon dioxide.

When the tin compounds used have halogen atoms linked directly to the tin atom, then chlorine, fluorine, bromine or iodine may be used. Because of its availability, chlorine is the preferred halogen.

When the tin compounds contain organic radicals, the radicals preferably have from 1 to 15 carbon atoms. The organic radicals preferably contain carbon and hydrogen atoms. Other atoms which may be present are oxygen, chlorine and sulfur atoms.

Examples of suitable tin compounds which may be used in the process of this invention are tin tetrachloride, di-n-butyltin dilaurate, di-2-ethylhexyltin maleate, di-n-butyltin adipate, di-n-butyltin dichloride, di-n-butyltin dibenzoate, di-n-butyltin dilactate, di-n-butyltin diacetate, stanno-2-ethylhexoate, di-n-butyltin-di-2-ethylhexoate, carbomethoxyphenyltin trisuberate, dimethyltin dibutyrate, divinyltin diacetate, diisoamyltin-bis-trichlorobenzoate, triethyltin tartrate, tri-n-butyltin acetate, triphenyltin acetate, tricyclohexyltin acrylate, tritolyltin terephthalate, di-n-butyltin dimethoxide, dimethyltin diethoxide, di-n-butyltin di-butoxide, tin tetraisopropoxide, tin tetramethoxide, tributyltin methoxide, tin naphthenate, bis-di-n-butyltin oleate)-oxide, bis-(di-n-butyltin stearate)-oxide, di-n-butyltin oleate hydroxide and dibutyltin-n-butoxychloride, as well as a di-n-butylin diacylate, where the acylate groups are derived from a mixture of carboxylic acids having from 9 to 11 carbon atoms per molecule in which the carboxyl group of at least 90 percent by weight of the acids is bonded to a tertiary carbon atom.

If corrosion, which is attributable to Sn-bonded halogen, is to be avoided, it is preferred that tin compounds which are free of Sn-bonded halogen, such as di-n-butyltin dilaurate be employed.

It is preferred that the tin compounds be employed in an amount of from 0.001 to 10 percent by weight, based on the weight of the silicon dioxide.

The silicon dioxide having a surface area of at least 50 m$^2$/g may be treated with the organosilicon and tin compound by mixing, spraying or vaporizing or gassing, for example in a mixing drum or in a container which is equipped with a stirring device, or in a fluidized bed apparatus or jet mills or ball mills. During and/or subsequent to the treatment of the silicon dioxide with the organosilicon and tin compound, heat may be applied, preferably at temperatures in the range of from 50 to 350° C. However heating is not essential and the process can be carried out successfully at room temperature, i.e., at approximately 18° C.

If heat is employed in the process of this invention, a heat treatment of from 5 minutes to 5 hours should be adequate.

The process of this invention is preferably carried out at atmospheric pressure, approximately 1 bar; however, higher or lower pressures may also be used.

Solvents which are inert with respect to the organosilicon and tin compounds may be employed. Suitable examples of solvents which may be used as aliphatic or aromatic hydrocarbons which are liquid at 18° C. and at 1 bar, ethers and ketones, for example benzene, toluene, xylene, acetone and diethylether. However, it is preferred that the use of solvents be avoided, if possible.

The products prepared in accordance with this invention may be used whenever hydrophobic finely divided silicon dioxide is desired. For example they may be used as fillers or as a component of fillers in diorganosiloxane-based compositions which cure to form elastomers and which are crosslinked by condensation in the presence of condensation catalysts, such as tin compounds. The products prepared in accordance with this invention may be used as opacifiers in varnishes, as fillers for thermoplastics such as polyvinylchloride, for duroplasts, such as phenol and formaldehyde resins and for natural or synthetic pure organic rubber, as components for fire control powders and for thermal insulation.

In the following examples, the methanol number represents the degree of hydrophobicity. This factor is determined as follows: About 0.2 g of the silicon dioxide which is to be tested is scattered on the surface of 50 ml of water. From a burette whose point is immersed in the water, methanol is added to the water while stirring until approximately 95 percent by weight of the silicon dioxide has been submerged. The methanol consumed (in ml) represents the methanol number.

EXAMPLE 1

About 10 g of silicon dioxide which was obtained pyrogenically in the gaseous phase and which has a surface area of $300\pm30$ m$^2$/g (commercially available under the trade name "HDK T 30" manufactured by Wacker-Chemie GmbH, Munich, German Federal Republic) is heated to 200° C. in a round bottom flask which is placed in a drying chamber with circulating air. Subsequently a glass vessel containing 200 mg of tin tetrachloride is suspended in the round bottom flask above the silicon dioxide. The flask is sealed and again heated to 200° C. in the drying chamber. After the tin tetrachloride has evaporated, 3 g of octamethylcyclotetrasiloxane is placed in the glass container which previously contained the tin tetrachloride, the flask is again sealed and heated to 200° C. in the drying chamber. After 2 hours any organosilicon compound which has not been consumed is removed by emptying the still hot flask.

EXAMPLE 2

The procedure described in Example 1 is repeated, except that 3 g of a mixture containing 1 part by weight of hexamethylcyclotrisiloxane and 3.17 parts by weight of octamethylcyclotetrasiloxane is substituted for the 3 g of octamethylcyclotetrasiloxane.

EXAMPLE 3

The procedure described in Example 1 is repeated, except that 3 g of a mixture containing 1 part by weight of hexamethylcyclotrisiloxane and 1.5 parts by weight of octamethylcyclotetrasiloxane is substituted for the 3 g of octamethylcyclotetrasiloxane.

EXAMPLE 4

The procedure described in Example 1 is repeated, except that 3 g of hexamethylcyclotrisiloxane is substituted for the 3 g of octamethylcyclotetrasiloxane.

EXAMPLE 5

About 20 g of silicon dioxide which was pyrogenically obtained in the gaseous phase, having a surface area of $200\pm20$ m$^2$/g (marketed under the designation "HDK N 20" by Wacker-Chemie GmbH, Munich, German Federal Republic) is sprayed with a mixture containing 2 g of a mixture of 1 part by weight of hexamethylcyclotrisiloxane and 1.5 parts by weight of octamethylcyclotetrasiloxane and 2 mg of di-n-butyltin dilaurate.

Subsequently the silicon dioxide is placed in plastic jars. The jars are then sealed and heated in a drying chamber for 2 hours at 100° C. during which time they are occasionally shaken.

COMPARISON EXAMPLES V$_1$ THROUGH V$_5$

V$_1$—The procedure described in Example 1 is repeated, except that the tin compound is omitted.

V$_2$—The procedure described in Example 2 is repeated, except that the tin compound is omitted.

V$_3$—The procedure described in Example 3 is repeated, except that the tin compound is omitted.

V$_4$—The procedure described in Example 4 is repeated, except that the tin compound is omitted.

V$_5$—The procedure described in Example 4 is repeated, except that the tin compound is omitted and hydrochloric acid is passed through the silicon dioxide for a few minutes before the silicon dioxide is heated.

The results of these Examples are illustrated in the following table.

TABLE

| Example | Methanol number |
|---|---|
| 1 | 26 |
| 2 | 30 |
| 3 | 47 |
| 4 | 68 |
| 5 | 70 |
| V$_1$ | 0 |
| V$_2$ | 0 |
| V$_3$ | 0 |
| V$_4$ | 3 |
| V$_5$ | 35 |

What is claimed is:

1. A process for the preparation of hydrophobic silicon dioxide which comprises treating silicon dioxide having a surface area of at least 50 m$^2$/g with at least one organosilicon compound having from 2 to 4 silicon atoms per molecule, in which at least 2 hydrocarbon radicals are bonded to each silicon atom and the silicon valences which are not satisfied by hydrocarbon radicals are satisfied by siloxane oxygen atoms, and at least on tin compound having radicals selected from the group consisting of Sn-bonded halogen, Sn-bonded organic radicals and mixtures thereof.

2. The process of claim 1, wherein the tin compound is free of Sn-bonded halogen.